United States Patent [19]
Becker et al.

[11] Patent Number: 5,752,407
[45] Date of Patent: May 19, 1998

[54] AGRICULTURAL SWEEP MANUFACTURING PROCESS

[75] Inventors: Ken George Becker, Hamilton; Carl Francis Ruigrok, Canfield, both of Canada

[73] Assignee: Case Corporation, Racine, Wis.

[21] Appl. No.: 374,815

[22] Filed: Jan. 19, 1995

[51] Int. Cl.[6] ............................. B21D 37/14; B21D 22/00
[52] U.S. Cl. .................................. 72/475; 72/352; 29/14
[58] Field of Search ................... 72/342.5, 342.1, 72/360, 364, 379.2, 412, 376, 352, 475, 374, 375, 441; 29/891, 14; 76/119; 411/399

[56] References Cited

U.S. PATENT DOCUMENTS

| | | | |
|---|---|---|---|
| 540,046 | 5/1895 | Chambers | 72/375 |
| 2,226,884 | 12/1940 | Wiese | 29/14 |
| 3,163,142 | 12/1964 | Buhrke | 72/360 |
| 3,304,761 | 2/1967 | Herzog | 72/375 |
| 3,874,205 | 4/1975 | Roch et al. | 72/441 |
| 3,933,023 | 1/1976 | Tatsumi et al. | 72/375 |
| 4,015,461 | 4/1977 | Schober | 72/360 |
| 4,420,962 | 12/1983 | Peterson | 72/360 |
| 4,461,162 | 7/1984 | Ibach | 72/360 |
| 4,609,315 | 9/1986 | Briles | 411/399 |
| 4,709,569 | 12/1987 | Sabroff et al. | 72/364 |
| 5,024,051 | 6/1991 | Glass et al. | 411/399 |
| 5,100,050 | 3/1992 | Krueger et al. | 72/360 |
| 5,249,884 | 10/1993 | Nagoshi et al. | 411/399 |
| 5,259,461 | 11/1993 | Cochrane | 172/730 |
| 5,392,629 | 2/1995 | Goss et al. | 72/379.2 |

Primary Examiner—Lowell A. Larson
Assistant Examiner—Rodney Butler
Attorney, Agent, or Firm—Daniel Hulseberg; Mayer, Brown & Platt

[57] ABSTRACT

A process for producing an agricultural sweep defining upper and lower major surfaces and having a predetermined shape including an earth engaging pointed head portion with a pair of wings symmetrically diverging rearwardly and generally horizontal from a nose region. Each wing has a bevel-like configuration on the upper surface of the sweep and an attachment portion integrally formed with and extending upwardly and rearwardly from the head portion. The unique process of the present invention begins with providing a planar preformed blank having a developed shape of the cultivator sweep. Thereafter, the blank is heated to an elevated temperature. The blank is thereafter loaded into a forming die set including first and second cooperatively arranged forming dies. One forming die is configured with a mirror image of one side of the cultivator sweep and the other forming die is configured with the opposite major side of the cultivator sweep. The complete and finished shape of the agricultural sweep is formed in a single press cycle from the blank.

17 Claims, 3 Drawing Sheets

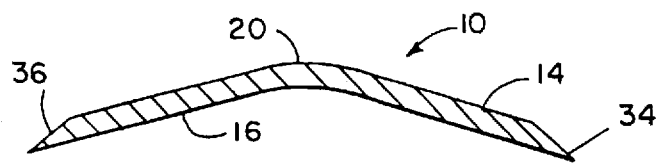
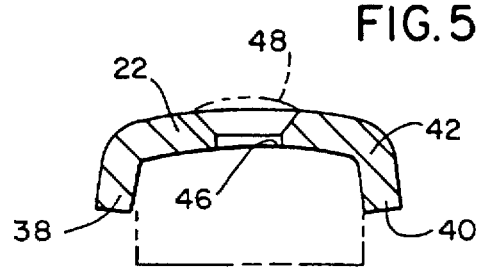
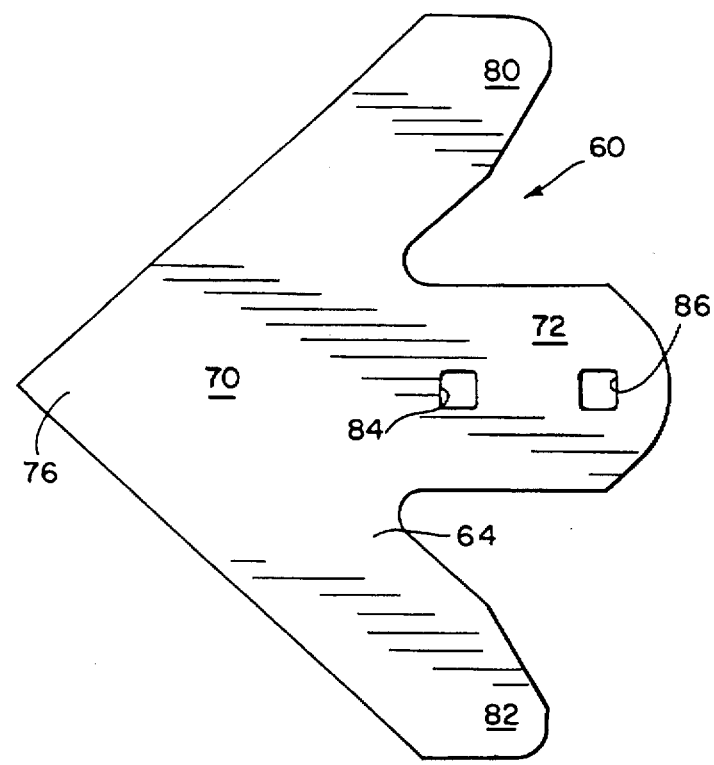
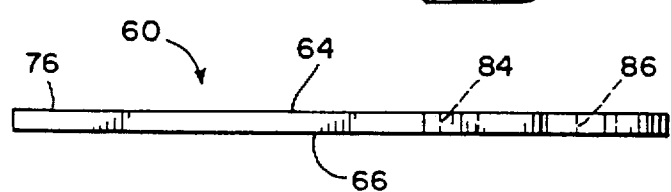

1

AGRICULTURAL SWEEP MANUFACTURING PROCESS

FIELD OF THE INVENTION

The present invention generally relates to sweeps used in combination with agriculture implements and, more particularly, to a process for producing agricultural sweeps.

BACKGROUND OF THE INVENTION

A well known form of agricultural sweep has a generally V-shaped configuration with a nose portion including a forwardmost ground penetrating point and a pair of wings which diverge outwardly and rearwardly from the point. Each wing is configured with "plating" or a bevel on their outer leading edges to improve both soil penetration and the ability for cutting roots as the sweep moves through the soil. The bevel on each outer edge either extends to the forwardmost point or stops just short thereof.

Various procedures are known for producing such sweeps. One such procedure begins with a generally triangular shaped blank that is heated in a furnace. After the blank is sufficiently heated, it is passed to a drop hammer where the blank is struck to provide two of the elongated edges on the blank with a bevel-like configuration. During this forging operation, it is also common to provide countersunk configurations or a major surface of the blank to indicate where two mounting holes for the sweep are to be provided.

As is well known, the drop hammer operation normally creates flashing along the edges of the blank. Accordingly, the blank requires reworking to remove the flashing therefrom. Flashing is normally removed from the blank in a separate press operation. After the flashing is removed from the blank, two holes are manually drilled or otherwise provided in the blank concentrically relative to the countersunk configurations provided thereon to configure the blank into a preformed or developed planar shape of the sweep. Finally, the blank is passed to a forming die to provide the ultimate form or profiled shape of the sweep.

After the blank passes from the forming die, it receives several further treatments. That is, the blank is initially cooled off and then wheel abraded. Furthermore, the blank is heat treated and subsequently painted.

An alternative known procedure for producing such sweeps involves starting with a generally planar blank having a preformed or developed shape of the sweep and that includes two separate mounting or attachment holes formed therein. The developed blank is sufficiently heated and put through a standard forging process. The standard forging process is typically effected on a screw press or an impactor press to impart the bevel-like edges of the blank. The blank is thereafter manually removed from the forging operation and passed to a forming die to form the ultimate shape of the sweep. The product is then removed from the forming die and passed to a machine where an operator manually countersinks the attachment holes for the sweep.

As is apparent from the above, known sweep manufacturing processes are extremely labor intensive. That is, the known sweep manufacturing processes involve several separate and individual steps for creating the sweeps. Of course, those procedures which are labor intensive result in higher manufacturing costs per unit even though the sweep itself is a relatively simple and typically one-piece mechanical tool.

Thus, there is a need and a desire for a simplified and more cost efficient procedure for producing sweeps for agricultural implements.

SUMMARY OF THE INVENTION

In view of the above, and in accordance with the present invention, there is provided a simplified and cost efficient procedure for producing agricultural sweeps. The improved method involves complete formation of a agricultural sweep from a developed or preformed blank in a single press cycle. That is, beveled edges, a countersink shape on mounting holes, and the complete body shape for the sweep is formed in a single stroke of a press and does not require passing the blank from one press operation to another to create the desired and complete predetermined shape of the sweep.

As is conventional, the sweep produced by the present invention defines upper and lower major surfaces and has a predetermined shape. The predetermined sweep shape includes an earth engaging pointed head portion with a pair of wings symmetrically diverging rearwardly and generally horizontal from a nose region. Each wing has a bevel-like configuration on the upper surface of the sweep and extending along a leading edge thereof away from the nose region. An attachment portion is integrally formed with and extend upwardly and rearwardly from the head portion.

The new process proffered by the present invention involves providing a planar blank having a preformed or developed shape of the agricultural sweep. That is, the planar blank has a generally arrow-headed configuration including a pointed head section with wing sections angularly diverging rearwardly therefrom. The planar blank further includes an elongated attachment section extending rearwardly from the pointed head section.

The process of the present invention further involves heating the planar blank to a predetermined and elevated temperature. Depending on a number of factors, the heating step preferably involves heating the blank to a temperature ranging between about 1700 degrees F. and about 2300 degrees F. A salient feature of the present invention involves imparting the complete predetermined shape of the agricultural sweep to the blank in a single cycle of a conventional press.

The heated and planar blank is loaded into a forming die set mounted in the forming press. The forming die set preferably includes a first forming die that is configured with a complete mirror image of the first major side of the agricultural sweep. The heated blank is pressed against the first die with a second die of the die set. The second die of the die set is movable along a predetermined path of travel for a given distance and is configured with a complete mirror image of the second major side of the agricultural sweep. During the pressing step, the blank is formed into the complete and predetermined shape of the sweep with the pointed head section of the blank being formed into the pointed nose region of the sweep and with the wing sections of the blank being formed into the pair of wings on the sweep that extend rearwardly, downwardly and outwardly relative to the nose region of the sweep. Moreover, the attachment section of the blank is formed into the attachment portion for the sweep thereby forming the complete predetermined shape of the sweep in a single press cycle.

In a preferred form of the invention, two attachment holes or apertures are defined in the attachment section of the planar blank. In the most preferred form of the invention, the bevel-like configuration arranged along the upper major surface of the sweep is concurrently imparted to the blank along with a countersunk configuration for each of the mounting holes. During the forming or pressing step, the dies of the forming die set press against each other at pressures ranging between about 500 tons and about 1300 tons to form the complete shape of the agricultural sweep during one press cycle of the die set. Moreover, the dies of the die set are limited in their travel toward each other within predetermined limits.

The process of the present invention further contemplates ejecting the completely shaped sweep from the die set. Preferably, the ejected sweep is directed toward a quenching bath to reduce the temperature thereof. Preferably, the sweep is thereafter cleaned and subsequently tempered to reduce the hardness of the sweep. In a most preferred form of the invention, the ejection, quenching, cleaning, and tempering of the sweep after the one cycle forming process requires minimum operator involvement thus, drastically reducing the manufacturing costs involved with producing the sweep.

With the present invention, the complete shape of the sweep is provided in a single press cycle as compared to the two, three or more separate manual shaping operations heretofore required for producing sweeps. The preferred forming process is completed at a predetermined elevated temperature and uses a developed blank shape including mounting holes in a single stage form die. This new process drastically reduces cycle time with less manual operations and thereby reduces the per unit cost over heretofore known sweep manufacturing processes.

Numerous other features and advantages of the present invention will become readily apparent from the following detailed description, the accompanying drawings, and the appended claims.

BRIEF DESCRIPTION OF THE DRAWINGS

FIG. 4 is a sectional view taken along line 4—4 of FIG. 2;

FIG. 5 is a sectional view taken along line 5—5 or FIG. 3;

FIG. 6 is a plan view of a generally planar blank from which the sweep is produced according to the present invention;

FIG. 7 is a side elevational view of the planar blink illustrated in FIG. 6;

DETAILED DESCRIPTION OF THE PRESENT INVENTION

Figure 1:
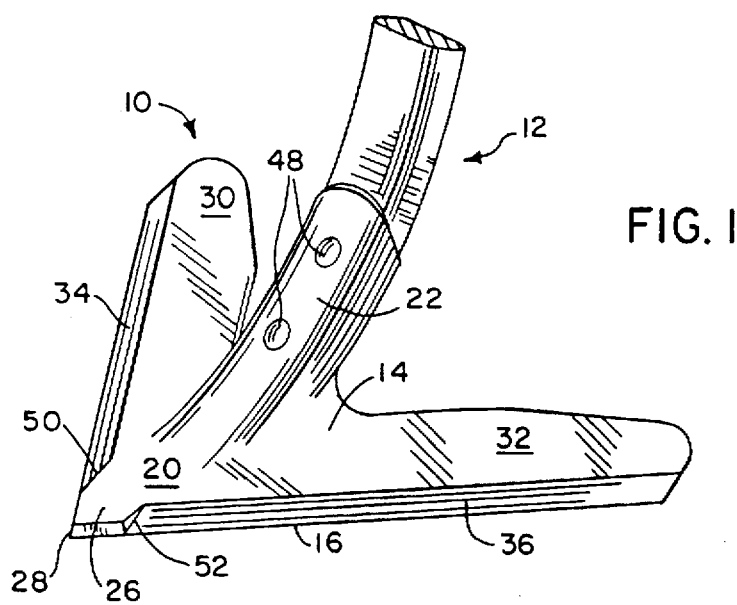
FIG. 1 is a perspective view of a sweep shown attached to a portion of a farm implement.

While the present invention is susceptible of embodiment in various forms, there is shown in the drawings one form that is hereinafter described with the understanding that the present disclosure is considered as an exemplification of the invention and is not intended to limit the invention to the specific embodiment illustrated.

Referring now to the drawings, wherein like reference numerals refer to like parts throughout the several views, there is shown an agricultural sweep generally designated by reference numeral 10. As shown, sweep 10 is adapted for releasable attachment to a depending support structure 12 of a mobile agricultural implement (not shown).

It should be appreciated that the sweep 10 illustrated in the drawings is exemplary of one series or family of sweeps to which the present invention finds utility. The agricultural sweep 10 illustrated in the drawings schematically represents one series or family of sweeps which can range from about 0.250 inches to about 0.312 inches in thickness and about 4.5 inches to about 12 inches in width. The present invention, however, is equally applicable to any of those family or series of sweeps which are commonly referred to in the industry as cultivator sweeps, chisel plow sweeps ranging up to 18 inches wide, offal sweeps, and "S" tine sweeps which can range between 2.5 inches and about 9 inches in width and about 4.5 millimeters in thickness. Suffice it to say, the term "sweep" as used herein refers generally to any of the family of sweeps discussed above.

Figure 2:
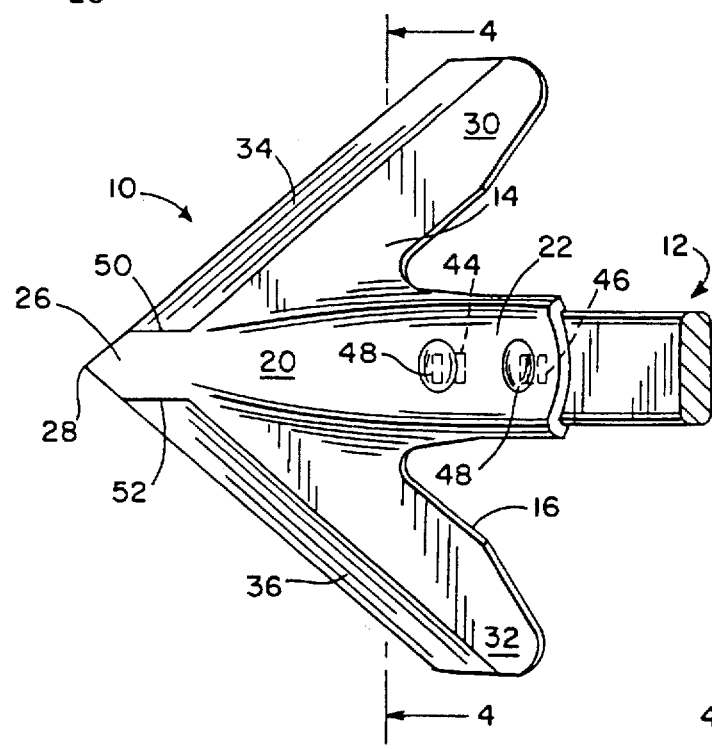
FIG. 2 is a top plan view of the sweep in FIG. 1.
Figure 3:
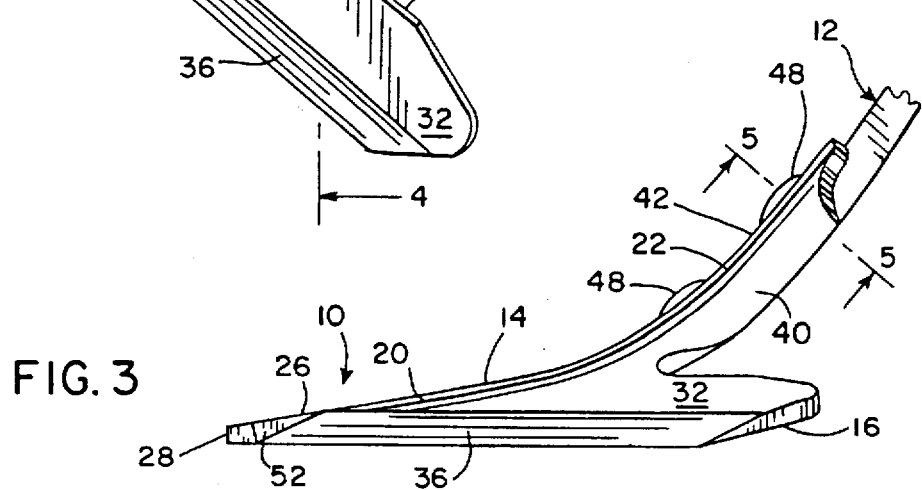
FIG. 3 is a side elevational view of the sweep as shown in FIG. 1.

Sweep 10 is provided with upper and lower major surfaces 14 and 16 and is of a predetermined shape. As shown in FIGS. 2 and 3, the general shape of the sweep 10 includes an earth engaging pointed head portion 20 at a fore end of the sweep and an attachment portion 22 at an aft end of the sweep. In the illustrated embodiment of the invention, the head portion 20 of sweep 10 has a substantially constant cross-sectional thickness. Depending upon which series or families of sweeps is chosen, the thickness of each sweep ranges between about 0.250 inches and about 0.343 inches in thickness. As illustrated in FIG. 4, the head portion 20 of each sweep 10 is widthwise provided with a generally concave cross-sectional configuration.

As is conventional, the head portion 20 has a nose region 26 that defines a forwardmost ground penetrating point 28. The head portion 20 is further provided with a pair of substantially identical wings 30 and 32. Each wing 30, 32 extends rearwardly, outwardly and downwardly from the nose region 26 of the sweep. Again, depending on which series of families of sweeps is chosen, the lateral distance measured across the wings may vary between about 2.50 inches and about 18 inches.

As is known in the art, and as shown in FIGS. 1, 2 and 4, each wing section 30, 32 includes a beveled outermost edge extending along the top or upper major surface 14 of the sweep to define blade regions 34, 36, respectively. Each blade region 34, 36 has a relatively thin outside edge to enhance the cutting ability of the sweep 10 as it is drawn to the soil. As shown in FIGS. 1 and 2, the blade regions 34, 36 on wings 30, 32, respectively, are of substantially equal length.

Turning to FIG. 3, the attachment portion 22 of sweep 10 is centrally located and preferably has a curvilinear configuration that extends upwardly and rearwardly from the integrally formed head portion 20 to facilitate attachment of the sweep 10 to the support structure 12 of the agricultural implement. As shown in FIG. 5, the attachment portion 22 of sweep 10 is preferably channel-shaped and includes a pair of laterally spaced sidewalls 38 and 40 that depend from and are integrally formed with a lateral front wall 42. As will be appreciated, the sidewalls 38, 40 and front wall 42 engage and embrace the sides of the supporting structure 12 thereby resisting lateral movement of sweep 10 during the field operations. As shown in FIG. 2, the front wall 42 of attachment portion 22 defines a pair of fore-and-aft spaced attachment or mounting holes or apertures 44 and 46. As is conventional on sweeps, each aperture or hole 44, 46 has a countersunk configuration opening to the upper surface 14 of the attachment portion 22 to facilitate locating suitable fasteners or bolts 48 that releasably secure the attachment portion 22 and thereby the sweep 10 to the supporting structure 12.

The illustrated embodiment of sweep 10 has a particularly shaped nose region 26 that advantageously promotes the useful life of the sweep. That is, sweep 10 may be provided with a nose region 26 similar to that disclosed in co-assigned U.S. Pat. No. 5,259,461 issued to James R. S. Cochrane; the entirety of which is incorporated herein by reference. As illustrated in FIG. 2, the bevel-like blade regions 34, 36 formed on wings 30 and 32, respectively, extend forwardly from a rear edge of each wing and terminate short of the foremost point 28. The width of nose region 26 is defined by a pair of generally vertical laterally spaced sidewalls 50 and 52; with each lateral sidewall 50, 52 forming an angle relative to the upper major surface 14 of the sweep. As shown, the bevel-like blade regions 34 and 36 on wings 30 and 32, respectively, extend forwardly and meet the laterally spaced sidewalls 50 and 52, respectively, of the nose region 26. As such, the cross-sectional thickness of the nose region 26 can be configured equal to about two times the cross-sectional thickness of the sweep thereby enhancing the wear capabilities of the sweep as compared to other sweep configurations.

That described above provides a general description of the configuration of the sweep to be produced by the process or method of the present invention and should not restrict the spirit and scope of the present invention. Whereas, the present invention is concerned with the method of producing a sweep similar to that described above.

The process of the present invention involves providing a generally planar blank, generally designated by reference numeral 60 in FIGS. 6 and 7. Blank 60 is formed of a suitable metal or metal alloy that is well known in the art. As shown, blank 60 has a developed shape of the sweep 10. That is, blank 60 has a generally planar configuration defining an upper major surface 64 and a lower major surface 66. The thickness of the blank is substantially equal to the thickness of the sweep that is to be produced. Moreover, blank 60 has an arrow-headed configuration including a head section 70 provided at a fore end of the blank 60 and an elongated attachment section 72 extending rearwardly from the head section 70. Head section 70 includes a pointed nose section 76. Wing sections 80 and 82 angularly diverge rearwardly from the pointed nose section 76. In a most preferred form of the invention, the attachment section 72 is provided with througholes 84 and 86 provided therein.

According to the present invention, blank 60 is heated to an elevated temperature ranging between about 1700 degrees Fahrenheit and about 2300 degrees Fahrenheit for the forming process. When about 0.0250 inches thick, the blank 60 is preferably heated to approximately 2200 degrees Fahrenheit for the forming process.

Figure 8:
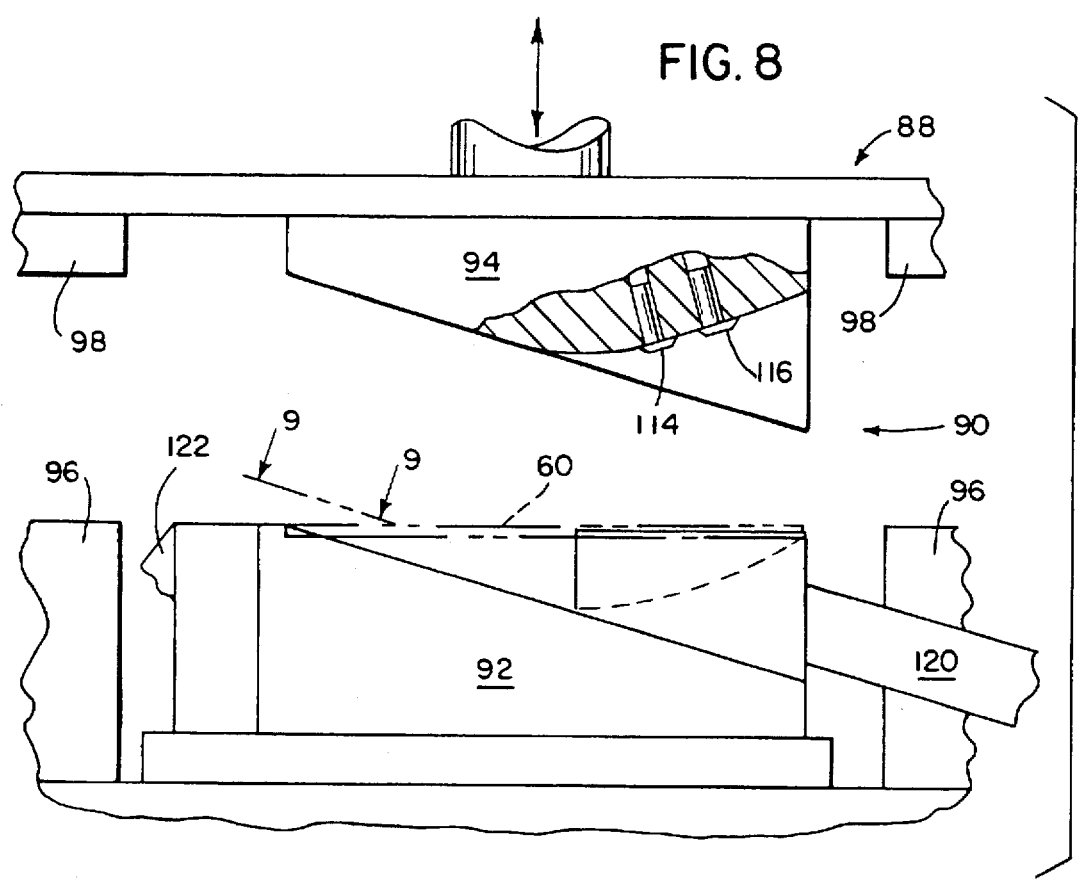
FIG. 8 is a schematic illustration of a die set used during the sweep manufacturing process of the present invention.

After the blank 60 is heated to a predetermined elevated temperature, it is transferred to a mechanical press generally indicated in FIG. 8 by reference numeral 88 and including a forming die set generally indicated by reference numeral 90. On the smaller sweep sizes ranging between about 2.5 inches to about 9 inches in width, a 500 ton mechanical press will suffice for the forming process. On that series or families of sweeps ranging in size from about 10 inches to about 18 inches in width, a 1300 ton mechanical press will be used for the sweep forming process.

The die forming set 90 in FIG. 8 is illustrated for exemplary purposes only and it should be appreciated that the details of the die forming set are well known to those skilled in the art. For purposes of succinctness and clarity, all the details of the die forming set will not be described in detail herein. Suffice it to say, the die forming set 90 includes a first or lower forming die 92 that is held stationary in the press 88 and a second or upper forming die 94 that is movable along a predetermined path of travel toward and away from the lower die 92 in a conventional manner. As will be appreciated, suitable limit stops 96 and 98 on the press 88 limit the travel of the second or upper die 94 relative to the first or lower die 92.

Figure 9:
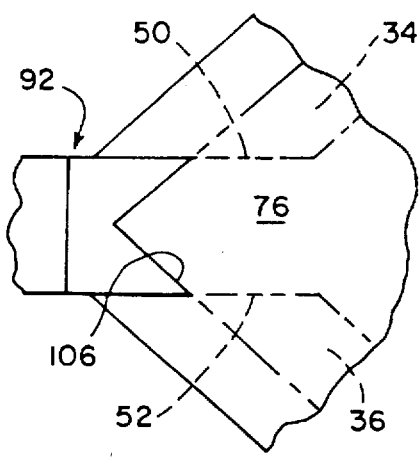
FIG. 9 is a fragmentary plan view taken along line 9—9 of FIG. 8.

As shown in FIG. 9, the first die 92 is configure with a nose receiving generally V-shaped notch or groove 106 that is adapted to releasably accommodate and locate the pointed nose section 76 of the heated and planar blank 60. The first die 92 is further configured to locate the attachment section 72 of the heated and planar blank 60. Suffice it to say, the first or lower die 92 is configured with a mirror image of one major surface of the sweep 10. In a most preferred form of the invention, the first forming die 92 is configured with a mirror image of the lower major surface 16 of the sweep 10.

Figure 10:
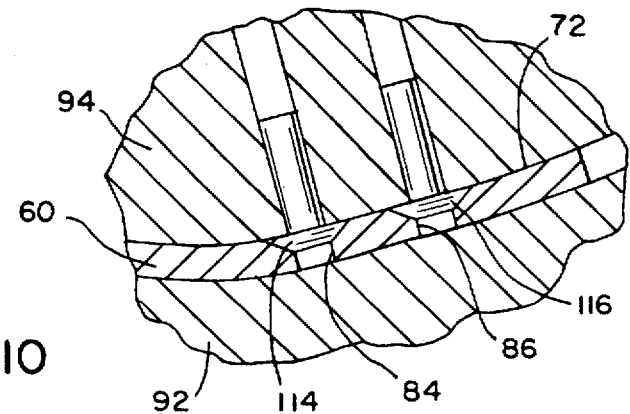
FIG. 10 is a enlarged partial sectional view of a portion of the die set illustrating a portion of the blank being formed therein.

The second or upper forming die 94 is mounted in a conventional manner on the press 88. The second or upper forming die 94 has a configuration that is the mirror image of the other major side or surface of the sweep 10. In the most preferred form of the invention, the upper forming die 94 has a mirror image of the upper major surface 14 of the sweep 10. As illustrated in FIGS. 8 and 10, the upper forming die 94 is provided with a pair of fore-and-aft spaced countersink forming pins 114 and 116 or other suitable configurations for imparting a countersunk configuration to the througholes 84 and 86, respectively, in the heated blank 60.

In the illustrated form of the invention, the dies 92 and 94 of the forming die set 90 are configured to specifically shape the attachment portion 22 of sweep 10 from the attachment section 72 of the blank 60 in a single press cycle. That is, die 94, when moved into operative association with die 92, in addition to imparting the curvilinear configuration thereto, shapes the attachment section 72 of the blank 60 by imparting laterally spaced side walls 38 and 40 that depend from the front wall 42 thereby completely shaping the attachment portion of the sweep 10.

Moreover, the lower and upper dies 92 and 94, respectively, of the forming die set 90 are preferably configured to specifically shape the nose section 76 of the blank 60. That is, die 94, when moved into operative association with die 92, shapes the nose section 76 of the blank 60 to impart two laterally spaced side walls 50, 52 (FIG. 9) that define the width of the nose portion 26 on the sweep and with bevelled edges 34, 36, respectively, extending rearwardly therefrom. In the illustrated form of the invention, the dies 32 and 94 are configured such that the side walls 50, 52 defining the width of the nose region 26 are laterally spaced apart a distance equal to at least two times the thickness of the sweep 10 thereby advantageously promoting the useful life of the sweep.

In accordance with a preferred method or process of the present invention, the die set 90 may further include an ejector apparatus, generally designated by reference numeral 120 in FIG. 8. The purpose of the ejector apparatus 120 is to eject the formed cultivator sweep having its predetermined shape from the forming die set 90.

While the ejector apparatus may be configured in several different forms, in a most preferred form of the invention, the ejector apparatus 120 includes sensors (not shown) for monitoring the position of the second or movable forming die 94 relative to the stationary die 92. In a preferred form of the invention, the ejector apparatus 120 further includes spring biased lift pins (not shown) preferably carried by the lower forming die 92 for imparting a vertical lifting force to the cultivator sweep after it is formed in the forming die set. Moreover, the ejector apparatus 120 may further include elongated slidable fingers (not shown) that are preferably guided by the lower forming die 92 to forcibly engage and eject the formed sweep from the forming die set 90. The ejecting pins or fingers are preferably operated by suitable drivers such as air cylinders that are operated in response to signals derived from a well known control system (not shown) of which the sensors form an integral part.

The process of the present invention further includes the step of quenching the formed cultivator sweep in a suitable solution to reduce the temperature thereof. The solution suited for quenching the cultivator sweep is well known in the industry and requires no further explanation. Suffice it to say, the formed cultivator sweep is removed from the forming die set 90 and passed as by a gravitationally fed chute or other suitable conveyance means 122 to be quenched in the suitable quenching solution.

The process of the present invention may further include the step of cleaning the quenching solution from the cultivator sweep and thereafter tempering the cultivator sweep after it is cleaned of the quenching solution to reduce hardness of the cultivator sweep.

With the present invention, the heated and planar formed blank 60 is arranged in the forming die set 90 and after a single cycle of the press the predetermined shape of the cultivator sweep 10 is produced. That is, according to the present invention, the blank 60 is formed into the predetermined shape of the sweep 10 with the head section 70 of the blank being formed into the head portion 20 of the sweep and the wing sections 80 and 82 of the blank 60 being formed into the wings 30 and 32 that extend rearwardly, downwardly and outwardly relative to the nose region 26 of the sweep 10. Moreover, during this one-cycle of the press, the attachment section 72 of the heated and planar blank 60 is formed into the attachment portion 22 for the sweep. Also, in a most preferred form of the invention, the lateral concave cross-sectional configuration is imparted to the head section 70 of the blank such that it corresponds to the head portion 20 desired for the sweep 10. In addition to those sweep forming operations mentioned above, during the single forming cycle of the press, the curvilinear configuration is imparted to the attachment section 72 of the sweep to result in the curvilinear attachment portion 22 of the sweep.

In a preferred form of the invention, the second forming die 94 simultaneously imparts a countersunk configuration to the throughholes 84, 86 in the preformed blank 60. As such, the resultant appearance of the attachment portion 22 includes countersunk holes 44 and 46 during one press cycle of a single stage formed die.

The additional processes including ejection of the sweep from the forming die, quenching, cleaning, and tempering preferably proceed in all automated fashion to reduce the manual labor required to produce the sweep.

The single press cycle of a single stage formed die inherent with the process of the present invention is completely different from heretofore known sweep formed processes. The single press cycle formation of a cultivator sweep dramatically reduces cycle time with less manual operations and thereby reduced the core unit costs over heretofore known systems.

From the foregoing, it will be observed and numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the spirit and scope of the claims.

What is claimed is:

1. A process for producing an agricultural sweep defining upper and lower major surfaces and having a predetermined shape including an earth engaging pointed head portion with a pair of wings symmetrically diverging rearwardly and generally horizontally from a nose region, with each wing having a bevel-like configuration on the upper major surface of the sweep and extending along a leading edge thereof away from the nose region, and an attachment portion integrally formed with and extending upwardly and rearwardly from the head portion, said attachment portion defining a pair of countersunk apertures therein, said process comprising the steps of:

providing a one-piece generally planar blank having a material thickness ranging between about 0.250 inches and about 0.312 inches and a length ranging between about 4.5 inches to about 12 inches, said blank having a developed shape of the agricultural sweep and which requires no material to be added thereto during formation of the agricultural sweep, said blank defining two throughbores therein;

heating said planar blank to a forging temperature between about 1700 degrees F. and about 2300 degrees F.;

loading said heated and planar blank into a die set comprised of first and second forming dies defining a chamber therebetween in the final and complete shape of the agricultural sweep and wherein the entire upper and lower surface configurations of the agricultural sweep are provided on the upper and lower dies, respectively; and forming the one-piece blank into the predetermined shape of said agricultural sweep by pressing said heated blank between said first and second dies of said die set, said second die being movable along a predetermined path for a given distance such that the complete and final shape of said agricultural sweep including said bevel-like configuration on the upper major surface of said agricultural sweep and with countersunk configurations being defined about the two throughbores in the attachment portion of the sweep such that the complete configuration of the sweep is formed from said generally planar blank in one press cycle of said die set.

2. The process for producing an agricultural sweep according to claim 1 further comprising the step of ejecting said agricultural sweep having said predetermined shape from said die set.

3. The process for producing an agricultural sweep according to claim 1 further comprising the step of quenching said agricultural sweep in a solution to reduce the temperature thereof.

4. The process for producing an agricultural sweep according to claim 1 wherein during said forming step said second die presses against said first die at pressures ranging from about 500 tons and about 1300 tons to form said agricultural sweep in one press cycle of said die set.

5. The process for producing an agricultural sweep according to claim 1 wherein the first die of said die set is configured to endwise position a pointed nose region of said blank within said die set during the loading step.

6. The process for producing an agricultural sweep according to claim 3 further comprising the step of cleaning the quenching solution from said agricultural sweep.

7. The process for producing an agricultural sweep according to claim 6 further comprising the step of tempering the cleaned agricultural sweep to reduce the hardness of the agricultural sweep.

8. A process for producing an agricultural sweep having upper and lower generally parallel major surfaces of a predetermined curvilinear shape, wherein said sweep includes an earth engaging head portion having a convex lateral cross-section with a pointed nose region and including a pair of wings that extend rearwardly, downwardly, and outwardly relative to the nose region, each wing having a bevel like-configuration on the upper major surface of the sweep and extending along a leading edge thereof, and an attachment portion that extends rearwardly and curves upwardly from the head portion, and wherein said attachment portion defines a pair of countersunk holes therein, said process comprising the steps of:

provide a unitary generally planar blank having a material thickness ranging between about 0.250 inches and about 0.312 inches and a length ranging between about 4.5 inches to about 12 inches, and wherein said blank is shaped to include an arrow-headed configuration including a pointed head section with wing sections angularly diverging rearwardly therefrom, said planar blank further including an elongated attachment section arranged in generally planar relation relative to and extending rearwardly from the pointed head section, with said attachment section defining two throughbores therein, and wherein said blank requires no additional material to be added thereto during formation of the sweep;

heating said planar blank to a predetermined elevated temperature between about 1700 degrees F. and about 2300 degrees F.;

loading said heated planar blank into a first die of a die set, said first die having a mirror image of said upper surface of the predetermined shape of said agricultural sweep;

pressing said planar blank between said first die and a second die of said die set with sufficient pressure causing the material of said blank to plastically deform and flow under the pressure established between said dies of the die set, with said second die having a mirror image of said lower surface of the predetermined shape of said agricultural sweep, said second die being movable along a predetermined path and for a predetermined distance relative to said first die, such that during the pressing step the planar blank is formed into the predetermined shape of the sweep with the convex cross-sectional configuration extending laterally thereacross and with the pointed head of the blank being formed into the pointed head portion of the sweep and with the wing sections of the blank being formed into the pair of wings on the sweep that extend rearwardly, downwardly, and outwardly relative to the nose portion of the sweep and having the bevel-like configurations on the upper major surface thereof, and wherein the attachment section of the blank is simultaneously formed into the attachment portion for the sweep with countersunk formations being defined about the througbores without requiring additional material to be added to the blank thereby forming the complete predetermined shape of the sweep in a single press cycle.

9. The process for producing an agricultural sweep according to claim 8 wherein during the pressing step and while the attachment section of the planar blank is being formed into the attachment portion of the sweep, two laterally spaced side walls and a front wall are formed to provide the attachment portion of the sweep with a channel shape configuration.

10. The process for producing an agricultural sweep according to claim 8 further comprising the step of ejecting the formed sweep from the die set.

11. The process for producing an agricultural sweep according to claim 8 further including the step of quenching said formed agricultural sweep in a solution to reduce the temperature of said agricultural sweep after said agricultural sweep is ejected from said die set.

12. The process for producing an agricultural sweep according to claim 8 wherein during said pressing step said die set applies pressures ranging between about 500 tons and about 1300 tons against said planar blank to form said agricultural sweep in one pressing cycle of said die set.

13. The process for producing an agricultural sweep according to claim 11 further comprising the step of cleaning said agricultural sweep to remove said solution from said agricultural sweep.

14. The process for producing an agricultural sweep according to claim 13 further comprising the step of tempering said cleaned and quenched agricultural sweep to reduce the hardness of said sweep.

15. A process for producing an agricultural sweep having upper and lower generally parallel major surfaces and a predetermined shape including an earth engaging head portion having a convex lateral cross-section with a pointed nose region, wherein the width of said nose region is defined by two laterally spaced generally vertical walls, said sweep further including a pair of wings that extend rearwardly, downwardly, and outwardly relative to the nose region, each wing having a bevel like-configuration on the upper major surface of the sweep and extending along a leading edge thereof, and wherein said sweep further includes an attachment portion extending rearwardly and upwardly from the head portion having two countersunk holes therein, said process comprising the steps of:

providing a one-piece generally planar blank having a material thickness ranging between about 0.250 inches and about 0.312 inches and a length ranging between about 4.5 inches to about 12 inches, and wherein said blank is shaped to include an arrow-headed configuration including a pointed head section with wing sections angularly diverging rearwardly therefrom, said planar blank further including an elongated and apertured attachment section arranged in generally planar relation relative to and extending rearwardly from the pointed head section, and wherein said blank requires no additional material to be added thereto during formation of the sweep;

heating said planar blank to a predetermined elevated temperature between about 1700 degrees F. and about 2300 degrees F.;

loading said heated planar blank into a first die of a die set, said first die having a mirror image of the upper major surface of the predetermined shape of said agricultural sweep, said first die further including, toward one side thereof, a triangularly shaped opening for locating the pointed head section of the blank in the die set and for forming the two generally vertical walls of the nose region in predetermined and spaced relationship relative to each other, said first die being further configured toward an opposite side thereof to releasably accommodate and locate the attachment section of the blank in the die set;

pressing said planar blank between said first die and a second die of said die set, said second die being movable along a predetermined path and for a predetermined travel toward said first die, with said second die having a mirror image of the second major surface of the predetermined shape of said agricultural sweep such that during the pressing stop the planar blank is formed into the predetermined shape of the sweep following predetermined movement of said second die such that the convex cross-sectional configuration extending laterally thereacross and with the pointed head of the blank being formed into the pointed head portion of the sweep and with the wing sections of the blank being formed into the pair of wings on the sweep that extend rearwardly, downwardly, and outwardly relative to the nose portion of the sweep, and wherein the attachment section of the blank is simultaneously formed into the attachment portion with countersunk formations extending about the apertures thereby forming the complete shape of the sweep in a single press cycle without requiring material to be added to the blank.

16. The process for producing an agricultural sweep according to claim 15 wherein said first and second dies of said die set are complementarily configured toward said one side thereof to provide the sweep with a nose region defined by side walls that are laterally spaced from each other by a distance approximating twice the thickness of the blank used to form the sweep.

17. The process for producing an agricultural sweep according to claim 15 further including the steps of ejecting the formed agricultural sweep from the die set, and directing the ejected and formed sweep along a predetermined path of travel for subsequent treatments.

* * * * *